(12) United States Patent
Brecht

(10) Patent No.: US 7,589,491 B2
(45) Date of Patent: Sep. 15, 2009

(54) TEMPERATURE COMPENSATION IN RECHARGING OF BATTERIES

(75) Inventor: William B. Brecht, Long Beach, CA (US)

(73) Assignee: Trojan Battery Company, Santa Fe Springs, CA (US)

( * ) Notice: Subject to any disclaimer, the term of this patent is extended or adjusted under 35 U.S.C. 154(b) by 325 days.

(21) Appl. No.: 11/372,702

(22) Filed: Mar. 10, 2006

(65) Prior Publication Data
US 2007/0210742 A1    Sep. 13, 2007

(51) Int. Cl.
*H02J 7/14* (2006.01)

(52) U.S. Cl. .................... 320/104; 320/128

(58) Field of Classification Search ............ 320/104, 320/128, 121, 134; 324/431, 426
See application file for complete search history.

(56) References Cited

U.S. PATENT DOCUMENTS

| | | | |
|---|---|---|---|
| 4,392,101 A | 7/1983 | Saar et al. | |
| 4,418,310 A | 11/1983 | Bollinger | |
| 4,503,378 A | 3/1985 | Jones et al. | |
| 4,746,852 A | 5/1988 | Martin | |
| 5,140,252 A | 8/1992 | Kizu et al. | |
| 5,307,001 A | 4/1994 | Heavey | |
| 5,444,353 A | 8/1995 | Shinohara et al. | |
| 5,469,043 A | 11/1995 | Cherng et al. | |
| 5,477,125 A | 12/1995 | Ettel et al. | |
| 5,656,920 A | 8/1997 | Cherng et al. | |
| 5,701,068 A | 12/1997 | Baer et al. | |
| 5,780,994 A | 7/1998 | Sisemore | |
| 5,900,718 A | 5/1999 | Tsenter | |
| 5,998,970 A | 12/1999 | Ishimaru et al. | |
| 6,087,805 A | 7/2000 | Langston et al. | |
| 6,114,833 A | 9/2000 | Langston et al. | |
| 6,300,763 B1 | 10/2001 | Kwok | |
| 6,377,030 B1 | 4/2002 | Asao et al. | |
| 6,392,385 B1 * | 5/2002 | Barker et al. | 320/130 |

(Continued)

FOREIGN PATENT DOCUMENTS

GB    2 120 472 A    11/1983

OTHER PUBLICATIONS

Cummings, et al. "Charge batteries safely in 15 minutes by detecting voltage inflection points"; EDN Access for Design, By Design; Sep. 1, 1994.

*Primary Examiner*—Matthew V Nguyen
*Assistant Examiner*—Nguyen Tran
(74) *Attorney, Agent, or Firm*—Christie, Parker & Hale, LLP

(57) ABSTRACT

Temperature compensation methods and equipment for charging electric storage batteries are described. Control over battery charging includes measurement of battery temperature at the commencement of a charging event, and use of inflection analysis of a charger voltage-time curve to detect the attainment of a distinctive signal point in the event. To compensate for the variations with initial battery temperature on the relation of the signal point to a different battery condition of interest, control of a charging event includes use of the measured battery temperature to obtain from a controller memory information about the applicable values of process parameters pertinent to those temperature-variable process factors. The temperature of a battery charger which includes such controls preferably is used as a workable approximation to battery temperature, so that batteries of conventional construction can benefit from use of the disclosed methods and equipment.

10 Claims, 8 Drawing Sheets

U.S. PATENT DOCUMENTS

| | | | |
|---|---|---|---|
| 7,439,710 B2* | 10/2008 | Ishishita | 320/132 |
| 2002/0060555 A1* | 5/2002 | Finger | 320/137 |
| 2005/0017684 A1 | 1/2005 | Brecht | |
| 2005/0029988 A1* | 2/2005 | Tran | 320/132 |
| 2006/0049805 A1* | 3/2006 | Tran | 320/149 |
| 2006/0152195 A1* | 7/2006 | Ishishita | 320/132 |

* cited by examiner

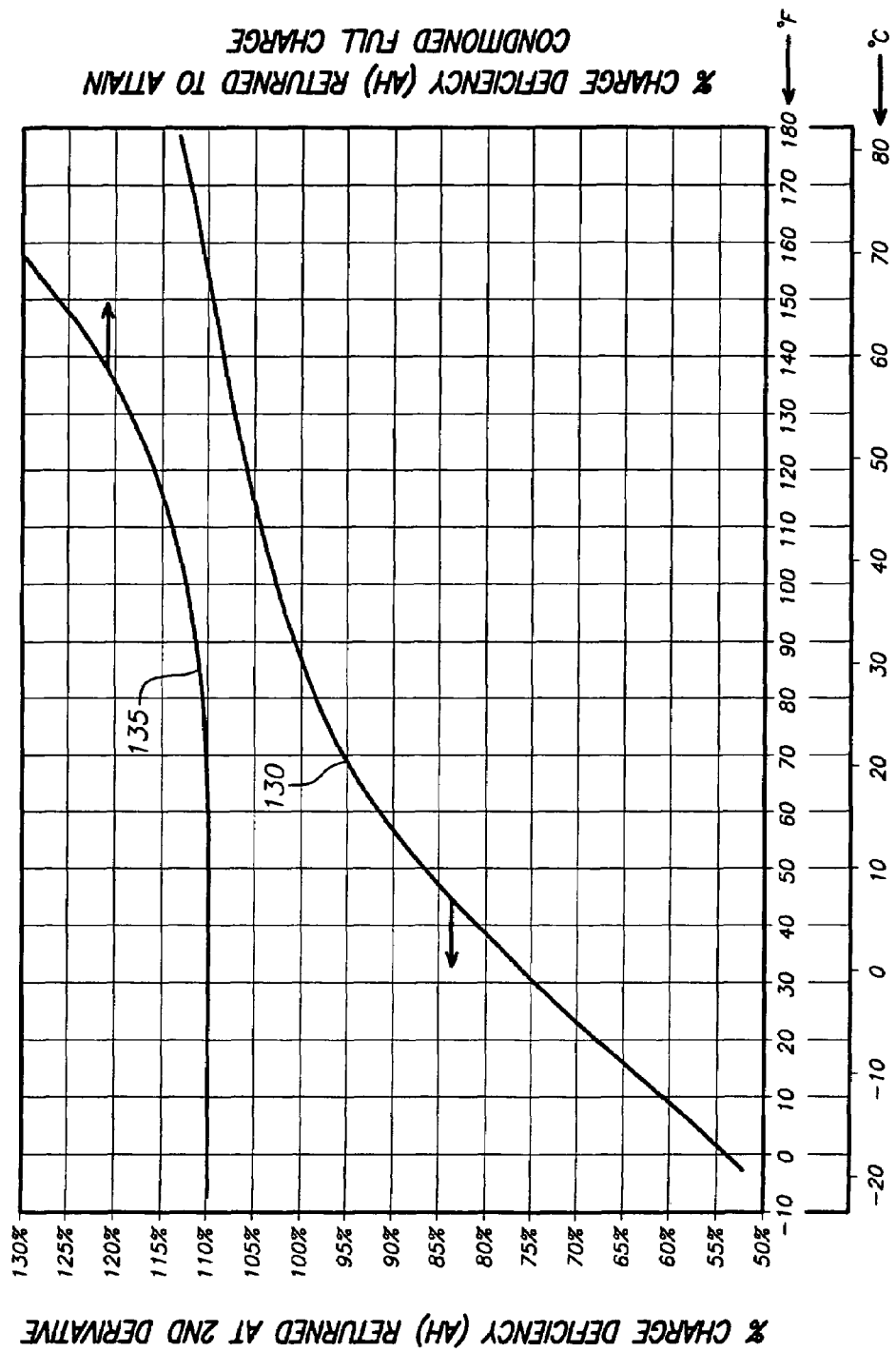

$°C = 5(°F - 32)/9$

°C = 5(°F - 32)/9

TEMPERATURE COMPENSATION IN RECHARGING OF BATTERIES

CROSS-REFERENCE TO RELATED APPLICATIONS

The invention disclosed and claimed in this application is related (other than in the manner required by 35 U.S.C. 120) to the invention disclosed and claimed in U.S. patent application Ser. No. 10/491,306 filed Mar. 29, 2004 as the national stage [35 U.S.C. 371] of international application PCT/US01/31141 filed 3 Oct. 2001. U.S. application Ser. No. 10/491,306 was published on Jan. 27, 2005 as U.S. patent publication No. US 2005/0017684 A1. The international application was published (corrected version) as of 10 Apr. 2003 as International Publication Number WO 2003/030831 A1. The inventor of the invention described in those publications is the inventor of the present invention.

FIELD OF THE INVENTION

This invention pertains to recharging of electric storage batteries. More particularly, it pertains to the recharging of batteries in which the electrochemistry of the charging process is affected by temperature in ways which cause an inflection point in curves descriptive of the delivery of chargers energy to a battery to shift relative to a state of full charge of the battery.

INTRODUCTION TO THE DISCLOSURE

This invention was conceived and has been developed in response to a need identified in the recharging of flooded deep-cycle lead and batteries. The invention is explained and described below principally in the context of the effective recharging of such batteries. The invention uses inflection analysis to detect a battery charge state which has a relation to a state of full charge of such a battery. That relation varies with the temperature of the battery. Effectively dealing with the temperature-variability of that relation is a first aspect of this invention. The lower curve in FIG. 2 of the present disclosure is pertinent to that first aspect of this invention.

Flooded lead acid batteries, and especially flooded deep-cycle lead acid batteries, benefit from controlled overcharging of such batteries in the terminal portion of a battery recharging event. Battery temperature also affects the amount of energy which is beneficially applicable to such a battery as overcharge energy. Effectively dealing with the temperature-variability of the amount of overcharge energy to be delivered to such a battery in a recharging event is a second aspect of this invention. The upper curve in FIG. 2 of the present disclosure is pertinent to that second aspect of this invention.

While batteries having electrochemistries different from the electrochemistry of lead acid batteries may not benefit from controlled overcharging (in some instances overcharging can be something which is to be avoided), those different electrochemistries may be such that battery temperature can adversely affect the usefulness of infection analysis to control battery recharge events and processes. In those situations the first aspect of this invention can be used to advantage to adjust and compensate for those adverse effects of temperature and to more effectively recharge such batteries.

BACKGROUND OF THE INVENTION

Rechargeable electric storage batteries of many different kinds are known, such as nickel-cadmium, nickel metal hydride, nickel-iron, lithium, silver-cadmium and lead acid batteries. Deep-cycle lead acid batteries differ from SLI (starting, lighting, ignition) lead acid batteries used, e.g., in conventional automobiles; SLI batteries are not designed or constructed to withstand repeated cycles of substantial discharge and recharge, and so are not rechargeable batteries in the fullest sense of this invention. Deep cycle batteries, on the other hand, are designed and constructed to withstand several hundred cycles of substantial discharge and recharge. However, to obtain the greatest number of such cycles from a deep cycle lead acid battery, it is important that each recharge event be performed in a way which both adequately recharges the battery and effectively conditions the battery for good performance in its next usage (duty) cycle.

It is known, such as from U.S. Pat. Nos. 4,392,101 and 4,503,378, and from published U.K. Patent Application GB 2,120,472A, that there are certain characteristics of a rechargeable battery, regardless of kind, which change during recharging of the battery in ways which can signal either that the battery is fully charged or that it is at a relatively predictable point relative to a state of full charge. Those patents, as well as other publications, describe equipment and techniques for monitoring those characteristics and for detecting certain events, conditions or states of them, and using such detections either to terminate the battery charging process or to continue charging for preset times or in preset ways. Those charging event detection techniques are known as inflection analysis methods because they rely on the detection of certain inflection points in time-based curves which describe the change in battery voltage or battery current, e.g., during the charging process. While inflection analysis as described to date may work well to control recharging of most kinds of rechargeable batteries, inflection analysis, as described before the development of the methods and equipment described in U.S. Patent Publication No. US 2005/0017684 A1, has been found not to serve satisfactorily for controlling recharging of flooded deep-cycle lead acid batteries in which the battery electrolyte is a liquid (typically sulfuric acid) unconfined in any supporting matrix such as a gel.

Flooded deep-cycle lead acid batteries are widely used as energy sources for electrically powered vehicles such as golf cars, fork lift trucks, and scissor lift vehicles. They also are used in uninterruptible power supplies in hospitals and other buildings and facilities, and as components of photovoltaic power installations, among other usages. The reasons why inflection analysis techniques, as heretofore described and used before the adoption of the methods and equipment described in published U.S. patent application Ser. No. 10/491,306 (discussed more fully below), are not satisfactory for controlling recharging of flooded deep-cycle lead acid batteries are reasons which can be understood from the use of such batteries in electric golf cars, as an example.

Electric golf cars are powered by sets of 4, 6 or so flooded deep-cycle lead acid electric batteries. At a given golf course, there is a fleet of such golf cars available for use by golfers. Different cars in the fleet may have older batteries in them than other cars in the fleet. Certain cars may be used more frequently than others. Some cars may be used longer on a given day than others. Some cars may be subjected to more strenuous usage conditions on a given day than others, depending on the circumstances of the using golfers or differences in traversed terrain, among other reasons. Also, it is well known that even if all batteries in the fleet are from the same manufacturer and are of the same nominal age, there still will be meaningful variations between batteries of kinds which can affect battery performance, life and, importantly, how they respond to recharging processes. As a consequence, at the end of a day when the golf cars in that fleet are to be recharged, there can be significant differences between the discharge states of the batteries from car to car, and consequent meaningful differences from car to car in how the batteries need to be charged. Fleet-wide uniform recharging procedures either will cause some batteries to be insufficiently recharged or, more likely, substantial numbers of the batteries will be materially overcharged. Material overcharge of such a battery reduces battery life. Very commonly, the persons employed to recharge fleets of golf cars have no understanding of the effects of substantial overcharge and how to determine when it is occurring. Therefore, it is desirable that the batteries used in electric golf cars be recharged by equipment and processes which avoid substantial overcharge and do so in ways which inherently accommodate and deal with differences between batteries due to discharge state, age, and manufacturing variations, among other factors.

Deep-cycle lead acid batteries are designed to withstand repeated cycles of substantial discharge from a fully charged state and of recharge from a discharged state to a state of full charge. As compared to other kinds of rechargeable batteries which do not use liquid electrolytes, the liquid acid electrolyte of flooded deep-cycle lead acid batteries presents special conditions which require that a given battery, or a given set of a small number of batteries repeatedly used in combination with each other, be recharged in a way which provides a controlled overcharge related in extent to the discharge state of the battery at the time a recharge event is commenced. Stated differently, effective recharge of a flooded deep-cycle lead acid battery ideally should include a controlled overcharge determined by the amount of energy removed from (discharged by) the battery during its last preceding duty cycle (period of use following the last prior charging event). The reason is related to what happens to the liquid electrolyte during the prior duty cycle and the following recharge event.

As a cell of a lead acid battery discharges, the sulphate ($SO_4$—) ions in the electrolyte move to the cell electrodes and oxygen ions move from the positive electrode active material of the cell into the electrolyte to form water with the electrolyte hydrogen ions. As a consequence, the electrolyte acid becomes progressively more diluted and its specific gravity progressively approaches 1.0 from a higher starting specific gravity. As the cell is recharged, that ion exchange process is reversed to produce regeneration of the electrolyte acid and of the electrode active material. If the electrolyte is present in the cell as a free liquid (i.e., the cell is flooded), as opposed to being present in a gel matrix, e.g., the regenerated acid, being heavier (higher density) than the dilute electrolyte, sinks to the bottom of the cell as it is created. As the recharging process continues, more and more concentrated regenerated acid collects in the bottom of the cell. At the point at which the cell active material has been fully regenerated, the cell is theoretically fully recharged on a Coulombic basis. However, the cell is not in good condition for use to deliver stored electrical energy because of the density stratification of the electrolyte. The electrolyte is not of uniform acidity (strength) throughout the cell and so the regenerated acid electrolyte is not in uniformly effective contact with the regenerated active material over the full area of the regenerated active material; if the cell were to be called upon to discharge at that point, the discharging electrochemical process will occur predominantly in the lower part of the cell where the electrolyte acid is overly concentrated. The cell will not discharge energy at the levels desired, and the over-concentrated acid in the bottom of the cell will cause overly rapid degradation of the adjacent active material. The consequence is under performance of the cell in a manner which materially reduces cell life.

In the portion of the recharge process for a flooded lead acid battery cell which immediately precedes full regenerative restoration of the active material, gas is generated in the cell as a normal part of the recharge process. Gas bubbles rise through the electrolyte to the top of the cell and, in the process, induce circulation (stirring) of the electrolyte in the cell. However, if the recharge process is terminated at the point of full regeneration of the active material, the amount of gas generation which will have occurred will be insufficient to stir the stratified electrolyte adequately to cause it to be of uniform acid concentration (uniform specific gravity) throughout the cell. For that reason, it is common practice to continue the process of recharging a flooded deep-cycle lead acid battery beyond the point of full recharge, i.e., to extend the gas generation process for a time to achieve adequate stirring of the regenerated electrolyte. That is, the battery is intentionally overcharged.

Current practice is to overcharge such batteries, which include a number of cells, by a predetermined amount which is defined to be adequate to fully stir the electrolyte in the cell or cells which need the most stirring; that definition of the predetermined amount of overcharge is based on the assumption that the cell has been maximally discharged in its previous period of use (duty cycle) and that the cell has certain properties of age, condition and temperature. However, as shown above in the discussion of the operation of a fleet of electric golf cars, that assumption is not apt for a substantial portion of batteries requiring recharge. As a result, reliance upon that assumption about the amount of overcharge to be applied in the terminal stages of recharging flooded deep-cycle lead acid storage batteries causes a substantial number, if not the majority, of such batteries to be meaningfully overcharged. Meaningful overcharge of such a battery, especially if repeated more than a few times, substantially reduces the effective life of such a battery. Battery life can be meaningfully extended if, each time a flooded deep-cycle lead acid battery is recharged, the extent of overcharge is related to the discharge state of the battery at the beginning of the recharge event. In that way, the amount of overcharge is related to the extent to which the battery electrolyte needs to be stirred to condition the battery for good performance in the course of its next duty cycle.

The foregoing description provides a foundation for understanding how existing descriptions of inflection analysis techniques for controlling battery recharge processes are deficient when applied to the recharging of flooded deep-cycle lead acid storage batteries.

U.S. Pat. No. 4,392,101 is an early description of the use of inflection analysis in controlling recharging of rechargeable batteries. It teaches that rechargeable batteries in general have broadly similar response characteristics to recharging processes. It teaches that if battery voltage or current, e.g., is plotted graphically against time during recharge, the resulting voltage/time or current/time curves will have broad similarities. After initiation of the recharge process, irrespective of the particular materials used to define a battery cell, those curves will manifest at least a pair of inflection points in which the graph line reverses curvature, i.e., is inflected. It is disclosed that those inflection points signal or denote different phases of the battery's response to applied charging energy and, for each type of cell, those inflections occur at relatively predictable times in the process, either before or at the time of the battery reaches a state of full charge. It is disclosed that the predictability of the inflection point occurrences is generally unaffected by (happens without regard to) factors such as the actual voltage of the battery, individual cell characteristics, or individual charging history. That patent discloses that the inflection points can be identified by observing the state or character of the first (velocity) derivative $dv/dt$ or second (acceleration) derivative $d^2v/dt^2$ with respect to time of the battery characteristic (voltage, e.g.) being monitored. More particularly, it teaches that a graph of the second derivative of the voltage/time curve will cross the zero axis (the sign of the derivative will change from positive to negative, or vice versa) at least twice during the charging process, and the second zero axis crossing of that derivative either will occur at the time the battery reaches full charge or will occur at some interval before full charge is achieved. However, in the instance of lead acid batteries, that patent does not attempt to describe when the second time-based derivative of voltage occurs relative to full charge. The principal descriptions of that patent are in the context of nickel-cadmium batteries where recharging is terminated a preset time after that second zero-axis crossing of that derivative has been detected. Nickel-cadmium batteries do not use a variable density electrolyte which is present as a part of the chemical process and so such batteries do not benefit from or require any measure of overcharge.

U.S. Pat. No. 4,503,378 applies inflection analysis recharging controls to nickel-zinc batteries and discloses that, for that type of battery, recharging is to be terminated upon the occurrence of the second instance of sign change (zero axis crossing) of the second derivative of battery voltage with respect to time. It also observes that, at the same time as the second derivative crosses the zero axis from positive to negative, the value of the first derivative of battery voltage with respect to time is at a maximum or peak value, a fact which enables the second derivative's zero crossing to be confirmed.

The article titled "Charge batteries safely in 15 minutes by detecting voltage inflection points" appeared in the Sep. 1, 1994 issue of EDN Magazine. That article focuses principally upon fast recharging of nickel-cadmium batteries. It comments that inflection analysis also applies to lead acid batteries. In that connection, it states "In lead-acid batteries, the second $dv/dt$ inflection occurs at a predictable interval before the batteries reach full charge, but from the battery's Ahr [ampere-hour] capacity rating, you can easily derive the duration of the incremental charging needed to achieve full charge." That statement does not contribute, for at least two reasons, to a solution to the problem of how to efficiently, reliably and effectively charge a flooded deep-cycle lead acid battery, without meaningfully overcharging it, in terms of the battery's true need for recharge. First, a lead acid battery's Ahr (ampere-hour) capacity rating is not a precise value which can be determined accurately from engineering information. Rather, it is a value which a battery manufacturer assigns to a model or type of battery as a result of business factors peculiar to the manufacturer, such as marketing objectives, warranty policies, and other factors. A battery's ampere-hour capacity rating is merely a manufacturer's statement of the expectable performance, perhaps under unspecified conditions, of an average battery of that kind or type. It has no reliable relation to the charging needs of a particular battery after completion of a particular duty cycle, i.e., its depth of discharge before experiencing a recharging event. Second, the ampere-hour capacity rating is a value which needs to be known from a source other than the battery itself. What is needed is a way to charge a flooded deep-cycle lead acid battery using information, obtained from the battery itself or equivalently, which describes the battery's discharge state and which is usable to overcharge the battery only enough to stir the regenerated electrolyte adequately.

Published U.K. Patent Application GB 2 120 472A, published on 30 Nov. 1983, describes the recharging of lead-acid batteries by a process in which a form of inflection analysis is used. As the process is performed, the rate of change of the battery voltage ($dv/dt$) is monitored until $dv/dt$ (first voltage/time derivative) reaches a maximum at time $T_1$. The amount of charging energy delivered to the battery from the beginning of the recharge event also is monitored. When that maximum of $dv/dt$ is detected, its value is noted. Further recharging energy is delivered to the battery and the decreasing value of $dv/dt$ is monitored until the value of $dv/dt$ has declined by a defined percentage of its maximum value; that percentage is disclosed to be in the range of 25% to 60% of the maximum value of $dv/dt$. At the point (time $T_2$) at which the value of $dv/dt$ has decreased by the specified percentage of that function's maximum value, the battery is considered to be fully charged. The application of charging energy to the battery is continued beyond that point ($T_2$) until the time $T_3$ when a further overcharge quantity of energy has been delivered to the battery. The magnitude of the overcharge energy quantity applied to the battery in the interval between times $T_2$ and $T_3$ is determined as a percentage of the quantity of energy delivered to the battery in the period between commencement of the recharge event (time $T_0$) and time $T_2$. Thus, British Patent Application GB 2 120 472A describes a battery recharging process which seeks to define the amount of overcharge energy delivered to the battery with reference to the charge state of the battery at the beginning of the pertinent battery recharge event.

Apart from the patent and literature descriptions reviewed above, it is known to physically attach to a battery, such as a battery in a golf car, an integrating ampere meter (ampere-hour meter) and a computer-based recharge controller which travel with the battery at all times. When the battery is connected to a charger following a battery duty cycle, the "on board" ampere-hour meter and recharge controller are connected to a specially constructed charger. The on board controller obtains from the ampere-hour meter the value of ampere-hours effectively removed from the battery during that last duty cycle. That information is used by the recharge controller to compute the total charge to be delivered to the battery by multiplying the metered value of ampere-hours by the desired factor (for example 1.10 or 110%) that has been found to produce sufficient stirring in the electrolyte. The recharge controller then monitors the ampere-hours returned to the battery by the charger. When the calculated value for the charge return is reached, that controller instructs the charger to terminate the charging process. That approach to more precise recharging of lead acid batteries is described in U.S. Pat. No. 6,087,805. While that approach is effective, it suffers from the added complexity of establishing a communication path between the vehicle and the charger which is in addition to the usual power cables which are used to connect a charger to the vehicle battery set. That approach also suffers from the added expense of equipping every battery, or every operational set of batteries, with its own captive ampere-hour meter and recharge controller which must be specially constructed to survive in the environment of the battery. That approach is independent of inflection analysis. That approach has the limitation that the vehicle and its battery charge monitoring and controlling equipment, on the one hand, and the charger hardware, on the other hand, are designed for each other; the vehicle must be recharged by a specially built charger, and the charger can be used only with vehicles which have been designed for use with the charger.

International (Patent) Publication Number WO 2003/030331 A1 and U.S. Patent Publication No. US2005/0017684 (both identified above at Cross-Reference to Related Applications) are equivalent to each other. They describe an approach to recharging of flooded lead acid batteries which seeks, in recharging such a battery in the course of a given recharge event, to limit the extent of battery overcharging to a selected fraction of the charge deficiency of the battery at the commencement of that recharge event. It seeks to achieve that objective by, in effect, having the battery itself, rather than an ampere-hour meter dedicated to the battery and traveling with it, provide the information about the battery's charge deficiency at the beginning of a given recharge event.

More specifically, the approach described in those two patent application publications relies on inflection analysis of the voltage-time curve associated with a given battery recharge event. It discloses that there is a detectable characteristic point in the event when the battery is at less than full charge and has a known relation to the full charge state. That point is a signal point which, when detected by the battery charger, and in combination with knowledge of the charging energy which has been delivered to the battery to that point in that recharge event, enables the determination of the total quantity of charging energy to be delivered to fully charge the battery and to overcharge the battery to an extent, determined in relation to the initial charge deficiency, to cause the battery electrolyte to have substantively uniform specific gravity throughout the battery. In that way, the amount of overcharge of the battery in that event is related to the charge state of the battery at the beginning of the recharge event and is controlled by the charger, on the basis of information provided by the battery itself, to provide adequate stirring of the acid electrolyte and to avoid undercharging and unnecessary overcharging of the battery.

However, there are inherent limitations to the usefulness of that battery recharging technique as it is disclosed in those published patent applications. Those limitations are limitations of temperature. Persons skilled in the art would understand, from the content of those publications, that the battery recharging process there disclosed is best performed with batteries at 80° F. (26.7° C.), but they would not be instructed by those publications how to adjust the process for effective use of the process with batteries at meaningfully different temperatures.

Battery Council International (BCI) is an organization of North American battery manufacturers. Among other activities, BCI establishes and promulgates standards pertinent to the manufacture and evaluation (testing) of batteries. BCI's standard temperature for battery tests is 80° F. BCI's standards are followed by North American battery manufacturers, and they are known to manufacturers in other places in the world even though they may not be followed in those other places. Thus, workers skilled in the art would recognize, from the several references to 80° F. in those published patent applications, that the battery charging process described in them is described in the context of the BCI standard temperature.

The reality of the electrochemistry of lead acid batteries is that, in the context of recharging such a battery, the relation between the charge state of a battery when the signal point (when $dv/dt$ is at a maximum value and $d^2v/dt^2=0$) is detected, on the one hand, and a full charge state of the battery, on the other hand, is a relation which varies with temperature. Also, it has been found, again as a consequence of the electrochemistry and other things which happen in a battery recharge event, that the amount of overcharge energy required for proper conditioning (electrolyte mixing) of the battery, defined as a proportion of the battery's initial charge deficiency, varies with temperature and is higher for hot (>80° F.) batteries than it is for cold (<80° F.) batteries. In light of those temperature effects upon the recharging of flooded lead acid batteries, it is now recognized that the descriptions provided in those published patent applications are of a special case situation in which the battery is at substantially 80° F. (26.7° C.).

Thus, a need continues to exist for procedures and equipment which can be used effectively, efficiently and reliably by persons who have little or no knowledge of battery technology to adequately recharge electric storage batteries, notably flooded deep-cycle lead acid batteries, at any temperature without meaningfully overcharging any one battery or of a defined small group of batteries. The term "defined small group of batteries" means a number of batteries, such as those installed in a given electric golf car, which most probably will be of the same age, will have experienced the same usage history, and will have shared the same duty cycle in the interval between the time when last recharged as a group and the time of the recharge event of interest. A need exists for such battery recharge processes and equipment which enables any suitably defined battery charger to be used with any battery or battery group without regard to the nature of other equipment in which the battery or batteries may be housed.

SUMMARY OF THE INVENTION

In light of the foregoing, this invention addresses problem situations not heretofore resolved in the art to provide procedures and equipment by which electric storage batteries, notably flooded deep-cycle lead acid batteries, at any realistically encounterable temperature, individually or in defined small groups, are rechargeable in terms of actual recharge requirements and minimal overcharge processes. The invention applies inflection analysis principles with consideration of battery temperature to customize each battery charging event to the needs of the battery, or battery set, presented to the charger which includes a novel computing and control device. These benefits and advantages are provided and achieved effectively and reliably without requiring any change in how the battery is made or used. Service personnel are required only to connect and to disconnect the charger to and from the battery.

Information about recharge requirements is obtained, in effect or actually, by the charger from the battery itself in the course of the charging process, without reliance upon an ampere-hour meter attached to the battery. That is, the charger does not know, and does not need to know, the discharge state of the battery before the recharging process is commenced. The invention is maximally protective of the batteries themselves and can lead to significantly extended battery life.

In terms of procedure, the invention provides a method for charging flooded deep-cycle lead acid batteries. The method includes the steps of measuring or effectively approximating the temperature of such a battery to be charged and having an initial charge deficiency. Another step is applying to the battery a first amount of charging energy which is adequate, in combination with an initial charge condition of the battery, to cause the battery to attain a detectable charge state. The detectable charge state is one which, for a lead acid battery, is less than a full charge condition and which has a determinable relation to a full charge condition; as made more clear below, if a lead acid battery is "hot" (i.e., at a temperature meaningfully above 80° F. or 26.7° C.), the detectable state may correspond to a point which is more than the initial charge deficiency which has been returned to the battery and the battery still is not at a fully charged state because the rate of self-discharge of the battery is higher at elevated temperatures. Another step in the method is applying to the battery a further second incremental amount of charging energy which is adequate, in combination with the initial charge condition and the first amount of charging energy, to overcharge the battery to a selected extent. The quantity of the second amount of charging energy is determined as a selected percentage of the first amount of charging energy when the detectable state of the battery is attained and is determined with respect to a battery having the measured (or effectively approximated) temperature.

A further step in the battery charging method can be that of providing in a memory of a battery charger control system information pertinent to the variation with temperature of a) the relation of the first amount of charging energy to the initial charge deficiency of the battery, and b) the relation of total charging energy deliverable to the battery to attain full charge to the initial charge deficiency. Another step in the method can be one in which determination of the quantity of the second amount of charging energy includes accessing the information for the measured temperature of the battery.

Either alternately or in combination with the method steps described in the preceding paragraph, another step in the method can be one in which determining the quantity of the second amount of charging energy includes evaluating the relation $Q_D = Q_S(1+x)/p$. In that relation, $Q_D$ is the total charging energy to be delivered to the battery in the period from the commencement of a battery charging event of interest to the end of that event, $Q_S$ is the first amount of charging energy, x is the decimal equivalent of the selected percentage, and p is the decimal value of the ratio of the first amount of charging energy to the initial charge deficiency of the battery.

In terms of its structural aspects, the invention provides a charger for charging lead acid batteries, preferably deep cycle lead acid batteries. The charger can include a DC source, an ampere-hour meter, a dv/dt measurement circuit, a $d^2v/dt^2$ measurement circuit, a temperature sensor, and information about the variation with battery temperature of certain parameters and variables pertinent to effective charging factors.

More specifically, the charger can include a controller coupled to the DC source, the ampere-hour meter, the temperature sensor, and the dv/dt and $d^2v/dt^2$ measurement circuits. The controller is configured to detect the point in a battery recharge event at which a battery is at substantially a predetermined percentage of full charge and to determine the value of $Q_D$ from the relation $(Q_S/p)=[Q_D/(1+x)]$ in which $Q_S$ is the ampere-hours of charging energy delivered to the battery in the interval from the beginning of the event to the time at which $d^2v/dt^2=0$ and dv/dt is maximum, p is the decimal equivalent of the percentage of replenishment charge (i.e., the percentage of the battery's charge deficiency at the beginning of the recharge event) delivered to the battery when $d^2v/dt^2=0$, x is the decimal equivalent of a desired percentage amount of replenishment charge to be delivered to the battery as an overcharge amount, and $Q_D$ is the ampere hours to be delivered to the battery from the beginning of the event to reach the overcharge amount. The controller also includes information about the variation of p and x with battery temperature, and circuitry and programming for accessing and using that information.

BRIEF DESCRIPTION OF THE DRAWINGS

These and other features and advantages of the present invention will be better understood from the following detailed description read in light of the accompanying drawings, wherein:

FIG. 2 is a graph which shows the variation with battery temperature of two factors which are pertinent to good recharging and conditioning of a flooded lead acid battery; the lower curve shows the relation between the signal point in the recharging process and the initial charge deficiency of the battery; the upper curve shows the relation between the total amount of charging energy deliverable to the battery and the initial charge deficiency of the battery;

GLOSSARY

Figure 1:
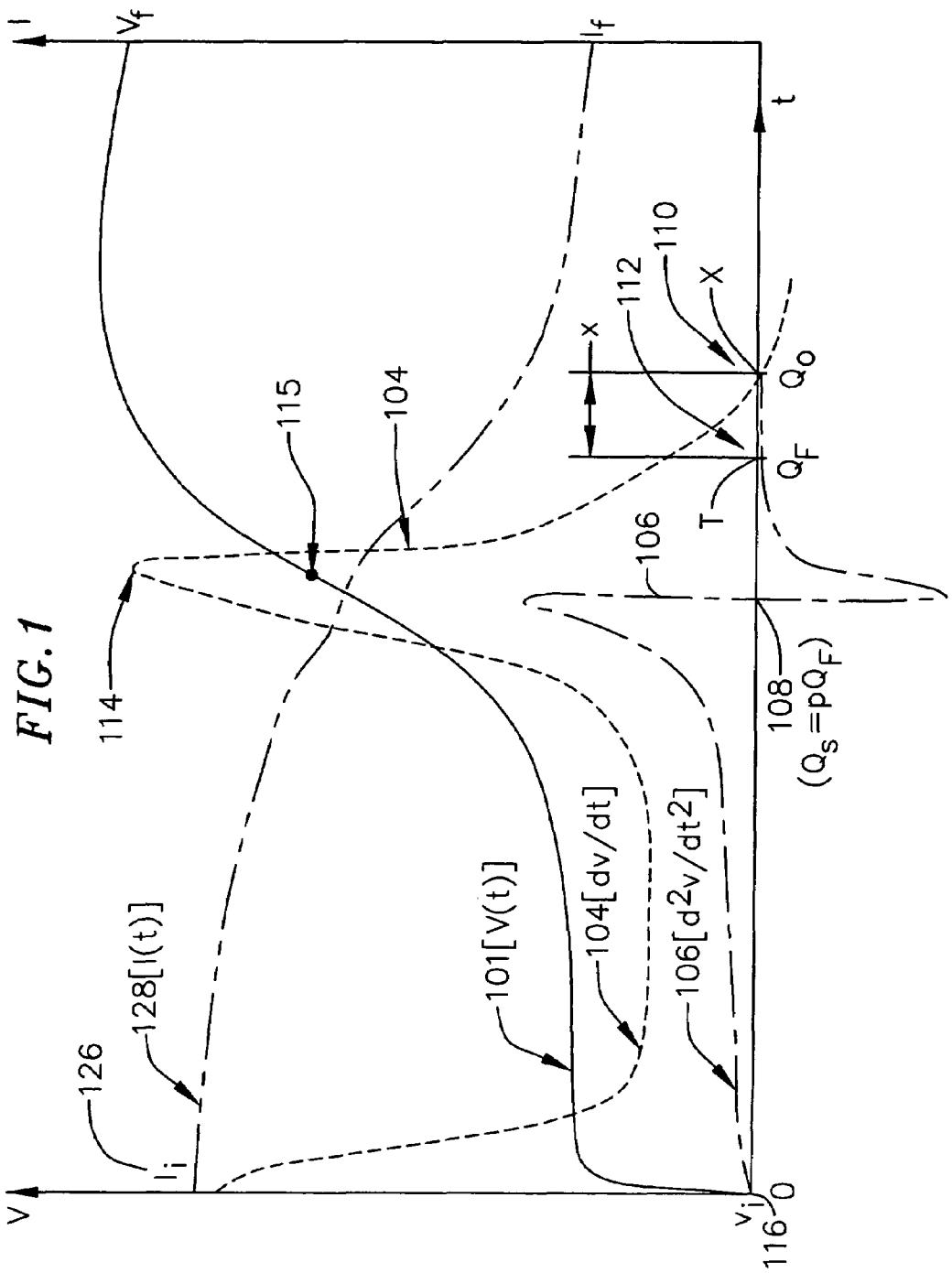
FIG. 1 is a graph of aspects of voltage and current at the terminals of a lead acid storage battery being charged with a conventional ferroresonant charger, graphed over time during a typical charging event.

Full charge $Q_F$: the state of a battery at which it is at full charge capacity and continued application of charging energy has no restorative effect upon the electrolyte or upon electrode active materials;

Initial state of charge $Q_i$: the amount of residual charge possessed by a battery at the commencement of a battery recharge event or process;

Replenishment charge $Q_R$: the amount of charging energy, measured in ampere-hours, absorbed by the battery having an initial state of charge to return the battery to a state of full charge; $Q_R = Q_F - Q_i$ Charge deficiency: the difference between a battery's full charge and initial state of charge; it is equal to the replenishment charge $Q_R$ Overcharge $Q_O$: the amount of charging energy, measured in ampere-hours, delivered to a battery in the course of a recharge event or process after the time the battery achieves full charge until the termination of the event or process; it is extra energy delivered to the battery to condition the battery for good performance during its next duty cycle; in the practice of this invention, its magnitude is directly related to the magnitude of the replenishment charge with consideration for the battery temperature at the beginning of a recharge event;

Coulombic charge $Q_C$: the amount of charge possessed by a battery at any time of interest;

Delivered charge $Q_D$: the ampere-hours of energy delivered to a battery during the interval between commencement and termination of a battery recharge event or process; in the practice of this invention it is the combination of the replenishment and overcharge ampere hours, i.e., $Q_D=Q_R+Q_O$; it is also the combination of $Q_S$ and $Q_A$.

Signal charge $Q_S$: the amount of charge, measured in ampere-hours, delivered to a battery during the interval beginning with the commencement of the recharging process and ending at that later detectable point (the signal point) in the process at which the battery, due to its particular electrochemistry and initial temperature, has a detectable condition indicative that the battery charge level has a particular relation to full charge; in the context of this invention, the detectable condition is a zero value of the second time-based derivative of battery voltage ($d^2v/dt^2$) coexisting with a maximum value of the first time-based derivative of battery voltage (dv/dt).

Additional Charge $Q_A$: the amount of charging energy, measured in ampere-hours, delivered to a battery in the interval between attainment of the signal point and the end of a recharge event; its magnitude is determined when the signal point is detected with consideration for the battery temperature at the beginning of the recharge event; $Q_A=Q_D-Q_S$.

Duty cycle: the period after a battery has been fully recharged during which the battery delivers energy during use of the thing in which the battery is located or to which it is connected; the battery charge at the end of a duty cycle is the battery's initial state of charge in the following battery recharge event or process;

DETAILED DESCRIPTION OF THE INVENTION

FIG. 1 is a graph of general aspects, without regard to the effects of battery temperature, of the voltage and the current at the terminals of a lead acid storage battery being charged by a conventional ferroresonant charger and depicted over time during a typical charging cycle or event; the graphed aspects are voltage 101, current 128, and the first 104 and second 106 derivatives of the voltage with respect to time. Such a charging characteristic is typically observed when charging a lead acid battery with a ferroresonant battery charger. A ferroresonant charger typically includes a transformer and a rectifier circuit that contributes to the distinctive shapes of the curves describing the way the current 128 and voltage 101 vary during a battery charging event. In implementing a charging cycle the duration of the charging cycle and the rate at which recharging energy is applied to the battery determines the amount of charge returned to the battery. To fully charge a flooded deep-cycle lead acid battery, a typical method utilized is to continue to charge, i.e., to overcharge, the battery after it has reached a state where charging current flowing into the battery has decreased significantly.

Controlling overcharge of a lead acid storage battery to a selected percentage of the battery's initial charge deficiency (generally equal to the ampere-hours removed from the battery during an immediately previous duty cycle) typically tends to greatly increase a battery's lifetime. Overcharge parameters are typically selected based upon varying criteria known to those skilled in the art. A battery thus charged to a selected percentage of ampere-hours removed in the prior duty cycle typically may have a longer useful life than a comparable battery which receives, each time it is recharged, an amount of overcharge defined as a fixed or selected percentage of the total charge capacity of the battery. Thus, knowledge and use of the initial battery discharge state (charge deficiency) when recharging begins aids in determination of the amount of overcharge best delivered to the battery.

A voltage response 101 during charging of a lead acid storage battery is shown as a function of time in FIG. 1. The voltage measured is that present across the battery's terminals at various times during the charging event. A particular voltage response 101 for each charging cycle of a battery, in response to a given value of an impressed charging current 128, changes as a function of the battery's temperature and internal conditions, which normally are a function of a battery's age. The temperature and the age of a battery are factors which can meaningfully affect how a given battery is best recharged. Thus, the basis for judging the initial charge deficiency or a subsequent charge state of a battery connected to a charger may not be reliably based on an absolute value of voltage.

A determination of the ampere-hours of battery charge deficiency is more reliably based upon inherent voltage-time characteristics of flooded lead acid storage batteries. The inherent voltage-time characteristics preferably utilized (see FIG. 1) are voltage as a function of time V(t) (curve 101), the rate of change of voltage over time (dv/dt) (curve 104), and the acceleration of the voltage over time ($d^2v/dt^2$) (curve 106).

A battery's voltage V(t), as measured across its external terminals, varies during a charging cycle in response to an impressed charging current I(t) (curve 128 in FIG. 1). A voltage across the terminals of a battery being charged and a charging current into the battery are related by a battery's internal resistance and back EMF (open circuit voltage) that typically varies during a charging cycle.

At a given time, a battery's internal resistance is determined by a series of conductive elements that make up a battery's cell structure disposed in the battery's electrolyte. At initiation of a charging cycle, or t=0 (see point 116 in FIG. 1), the initial battery voltage $V_i$ is the open circuit voltage. At initiation of a charging event, the current supplied by a charger typically is at its highest value $I_i$ (point 126) during the event.

During a typical charging event, battery voltage 101 is initially at a low value $V_i$, rises rapidly to an intermediate voltage from which the voltage continues to rise slowly for a period of time, after which the voltage rises rapidly again with an increasing slope where it finally levels to a final fully charged voltage $V_f$. As the battery is charged, the battery back EMF rises due to heat generated in the charging process and due to rising specific gravity of the electrolyte. As the battery charges, current 128 supplied by a charger decreases as the battery voltage 101 increases in step with the increasing battery impedance.

In the final stages of charging, a further increase in battery back EMF is caused by the electrolytic generation of hydrogen and oxygen gas as the electrolyte decomposes in response to the applied energy; that phenomenon is called "out gassing." Out gassing occurs as the battery nears and reaches a state of full charge, and its components can no longer accept recharging energy in a regenerative way. As the out gassing process stabilizes, the voltage across the battery's terminals remains essentially constant and approaches its final value.

In the final stages of charging, a slight increase in battery terminal voltage 101 appears due to an electrolyte stirring effect. The electrolyte stirring effect is caused by the out gassing process. The stirring effect causes the electrolyte within each of a series of cells in the battery to become substantially homogeneous, i.e., of uniform specific gravity (acid concentration), stabilizing the battery back EMF within each cell. It is often desirable to design a battery charging system that takes a battery's internal construction and the charging process into consideration in order to provide a desirable charging process.

Battery chargers are constructed utilizing various types of circuit designs. Circuit designs of chargers include ferromagnetic and switching techniques. The various types of battery chargers are also designed to provide one or more charging processes called "profiles" or "algorithms" that are compatible with the circuit design of the charger. Profiles are also often selected to take advantage of the internal changes in the battery during charging in an attempt to extend battery life.

A charger which has a termination scheme keyed to dv/dt=0 typically provides 118% to 124% of the charge previously taken out of the battery.

Continuing with reference to FIG. 1, the first derivative 104 and the second derivative 106 of voltage with respect to time provide additional information concerning a battery's charging requirements. In addition, the first and second voltage derivatives provide distinct transitions of state that are easily detected. The information provided by those first and second derivatives provides reliable criteria that are unique to an individual battery at a particular temperature, so that the charging profile may be tailored to that particular battery. By basing a battery's charging process on selected aspects of the first 104 and second 106 derivatives of the voltage response 101 curve and on information about the effect of battery temperature upon charge states and requirements, a charging process may be implemented that takes into account a battery's unique and individual charging requirements to provide an amount of overcharge that is appropriate for a particular battery at a particular temperature during a particular charging event.

As shown in FIG. 1, the interrelation between the voltage curve 101 and its first (dv/dt) 104 and second ($d^2v/dt^2$) 106 derivatives can provide a useful indication of the time that at which the battery actually is at a certain state less than a state of full charge. In FIG. 1, that state is identified by point 108 on the horizontal time base of the graph. Because it is a detectable point in a battery charging event and it has special significance, it can be called a "signal point."

In the voltage curve 101, the voltage increases over time until the end of the charging cycle. Prior to the end of the charging cycle, the voltage curve begins to rise rapidly before topping out and decreasing. Stated differently, curve 101 changes from being concave upwardly to being concave downwardly. During the rapid increase, curve 101 has an inflection point 115 at which the voltage ceases to accelerate and begins to decelerate. In the corresponding curve 104 plotting the first derivative of V(t), a maximum value 114 of the first derivative of V(t) occurs at the same time as the occurrence of the inflection point 115 of V(t). The first derivative (dv/dt) of the voltage curve 101 does not again rise to a peak. This maximum 114 of dv/dt provides a more accurate and more readily detected indication of charging signal point 108 than does voltage inflection point 115.

The curve 104 depicting the changes in the first derivative (dv/dt) is characterized by two response peaks. Initially, the first derivative 104 has a high value corresponding to a swiftly changing battery voltage. Next the curve 104 of rate of change of the battery voltage decreases as the voltage curve 101 goes through a period of slight change. The small values of rate of change are followed by a second rapid increase in the rate of change that peaks at 114 and then falls off. The peak 114 corresponds to the voltage curve 101 inflection point 115, where a maximum slope is measured. After the first derivative maximum has been reached, the rate of change 104 of the voltage 101 decreases.

The second derivative ($d^2v/dt^2$) of the voltage versus time function of the lead acid battery undergoing ferroresonant charging is shown by curve 106. The second derivative describes the rate of change of curve 104, which in turn describes rate of voltage change. Thus, curve 106 describes how the value of voltage applied to the battery terminals accelerates and decelerates during the battery charging process. As can be seen from the second derivative curve 106, the second derivative is zero when the first derivative curve 104 reaches a point where its slope is instantaneously equal to zero, such as at the previously described maximum 114.

The point in time at which the first derivative reaches a maximum value and the second derivative has a value of zero very accurately identifies the signal point 108 in the course of a battery recharge event. The abrupt change of the second derivative ($d^2v/dt^2$) from a positive to a negative value is easier to accurately identify than the gradual change in value of the first derivative.

Point 108 on curve 106 occurs at different times (t) for different batteries because this characteristic is related to the initial state of discharge, to battery age, and, significantly to certain characteristics of an individual battery which are affected by temperature. However, at point 108 the battery is at a detectable point in its recharge event at which the values of certain variables (factors) pertinent to optimum battery charging can be determined and used to advantage. That point is used as a detectable signal point in the practice of this invention, and the amount of charging energy which has been returned to the battery at that point, measured from the beginning of the pertinent recharge event, is denominated as the signal charge $Q_S$. Knowledge of the magnitude of $Q_S$ and of its relation to battery full charge $Q_F$ (or to the initial charge deficiency of the battery), together with the amount of overcharge $Q_O$ desired, enables the total deliverable (delivered) charge $Q_D$ to be determined and enables the charging process to be controlled accordingly.

Charge delivered to a battery can be measured in ampere-hours ("amp-hours"). One ampere-hour is the quantity of charge delivered to the battery in one hour by a one ampere current. Thus, a completely drained battery having a charge capacity specified in ampere-hours will take a number of hours equal to the specified ampere-hour capacity to return the battery to a fully charged state, or a desired fraction of full charge, at a one ampere charging current.

The amount of charge usefully returned to a battery to achieve the desired conditioning may be found by the following relation:

(specified % overcharge) times (ampere-hours from start of charge to reach the signal point)=(ampere-hours from start of charge to reach specified overcharge) times (% of initial charge deficiency delivered when the signal point is reached).

Stated differently using the terms defined above, $$Q_S/p=Q_D/(1+x) \text{ or } Q_D=Q_S(1+x)/p \quad \text{(Equation 1)}$$

where x is the decimal equivalent of a percentage of the replenishment charge $Q_R$ to be delivered to the battery as an overcharge amount, and p is the decimal equivalent of the percentage of the battery's initial charge deficiency which has been returned to the battery as applied charging energy when the signal point is reached in the battery recharge event of interest. Stated differently, p is the ratio of a) the ampere-hours delivered to the battery from the start of the recharge event to the time when the signal point is reached to b) the initial charge deficiency of the battery.

Time T, point 112 in FIG. 1, is the point in time at which the battery is fully charged, i.e., has charge level $Q_F$. Charge amount $Q_S$ is found from determining the second derivative's zero crossing. Thus, the total charge $Q_D$ to be delivered during the recharge event may be found, once Qs has been found, by analysis of the dynamic aspects of the charging characteristic curves, and once the values of p and x are known.

However, as noted above and as more clearly shown in FIG. 2, the relation between the occurrence of signal point 108 to a state of battery full charge, and the amount of charging energy to be delivered to the battery after the signal point is reached are things which vary with the temperature of the battery at the commencement of a recharge event. That is, the values of p and of x which pertain to a charging event and which affect the ability to controllably overcharge a battery to an extent measured by the battery's need for electrolyte stirring are values which vary with the temperature of the battery. Thus, lower curve 130 in FIG. 2 shows the variation of p with battery temperature, and upper curve 135 in FIG. 2 shows the variation of x [more specifically, the variation of the expression (1+x)] with temperature. More specifically, an ordinate (vertical or "y" value) of curve 130 is the percentage of the battery's initial charge deficiency $(Q_F - Q_i)$ which has been returned to the battery as applied charging energy when the signal point 108 is attained and the battery has the temperature corresponding to that ordinate. If the battery temperature $t_B$ is 80° F., curve 130 says that the amount of charging energy delivered to the battery when the signal point $(d^2v/dt^2=0)$ is reached is 98% of the battery's initial charge deficiency; i.e., at 80° F., p=0.98. Curve 130 says that if the battery temperature $t_B$ is above 80° F., p will be greater than 0.98, and if the battery's temperature is less than 80° F., then p will be less than 0.98. Curve 130 of FIG. 2 shows that if $t_B$ is much above 80° F., attainment of the signal point 108 requires that the amount of charging energy which must be delivered to the battery to reach the signal point is more than the battery's initial charge deficiency; that requirement is due to temperature-related and other inefficiencies in the charging process. One reason why the signal charge Qs is greater than the battery's initial charge deficiency for a lead acid battery having a temperature greater than about 85° F. (29.4° C.) is that the self-discharge of the battery increases with temperature, so that for a lead acid battery above that temperature the value of p is greater than unity at the signal point; at the signal point, the battery charge state is less than a full charge state because the self-discharge of the battery acts against the delivery of charging energy from the battery charger to the battery.

Curve 135 of FIG. 2 says that if battery temperature $t_B$ is at or below about 70° F., the amount of overcharge energy (measured as a percentage of the battery's initial charge deficiency) to be delivered to achieve adequate electrolyte stirring and conditioning of the battery is essentially constant at 10%. However, that curve also says that if battery temperature $t_B$ is above about 70° F., that percentage increases with increasing battery temperature.

Figure 3A:
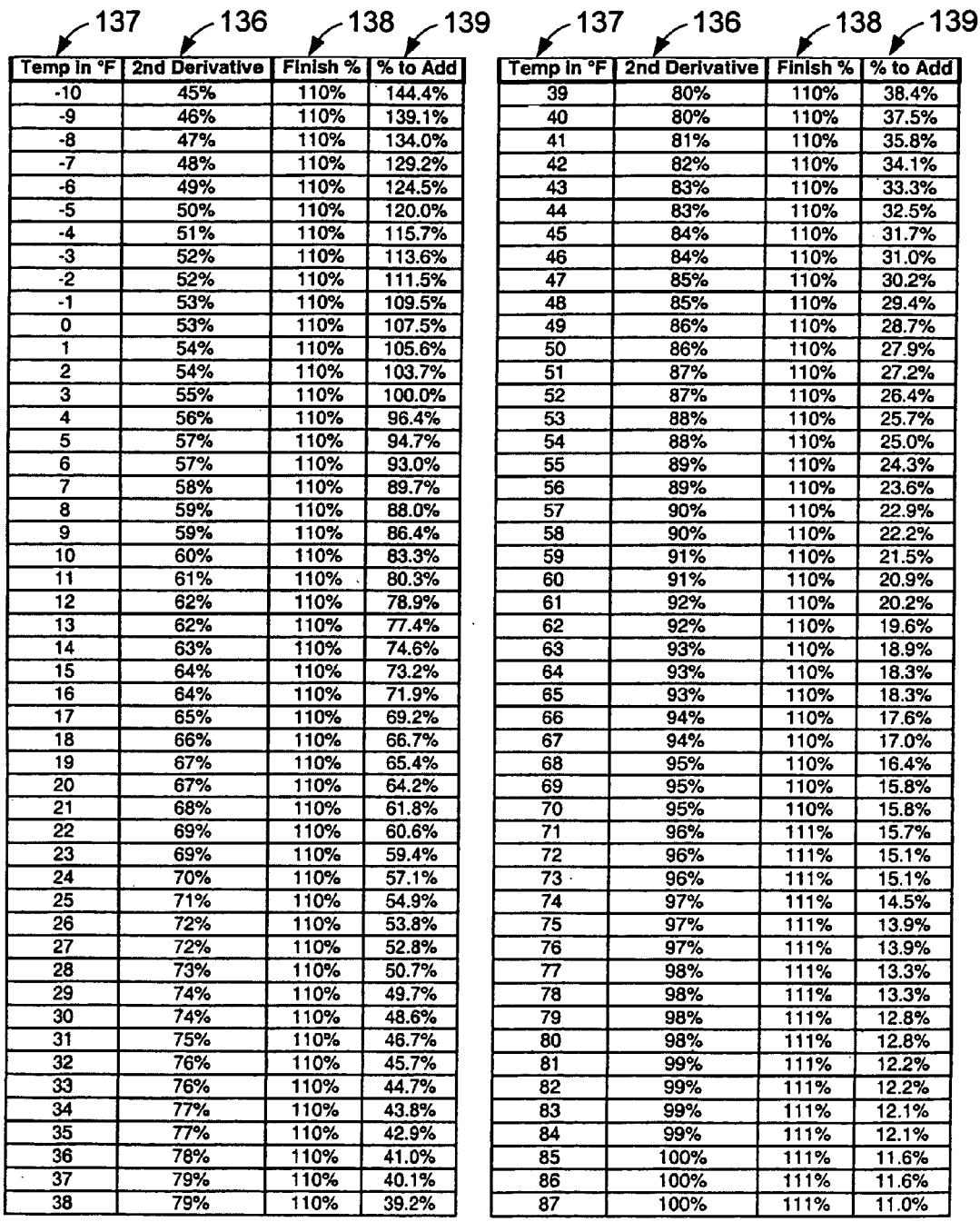
FIG. 3 is composed of FIGS. 3A and 3B and is a table which presents in tabular form the information provided by (contained in) the two curves in the graph of FIG. 2.
Figure 3B:
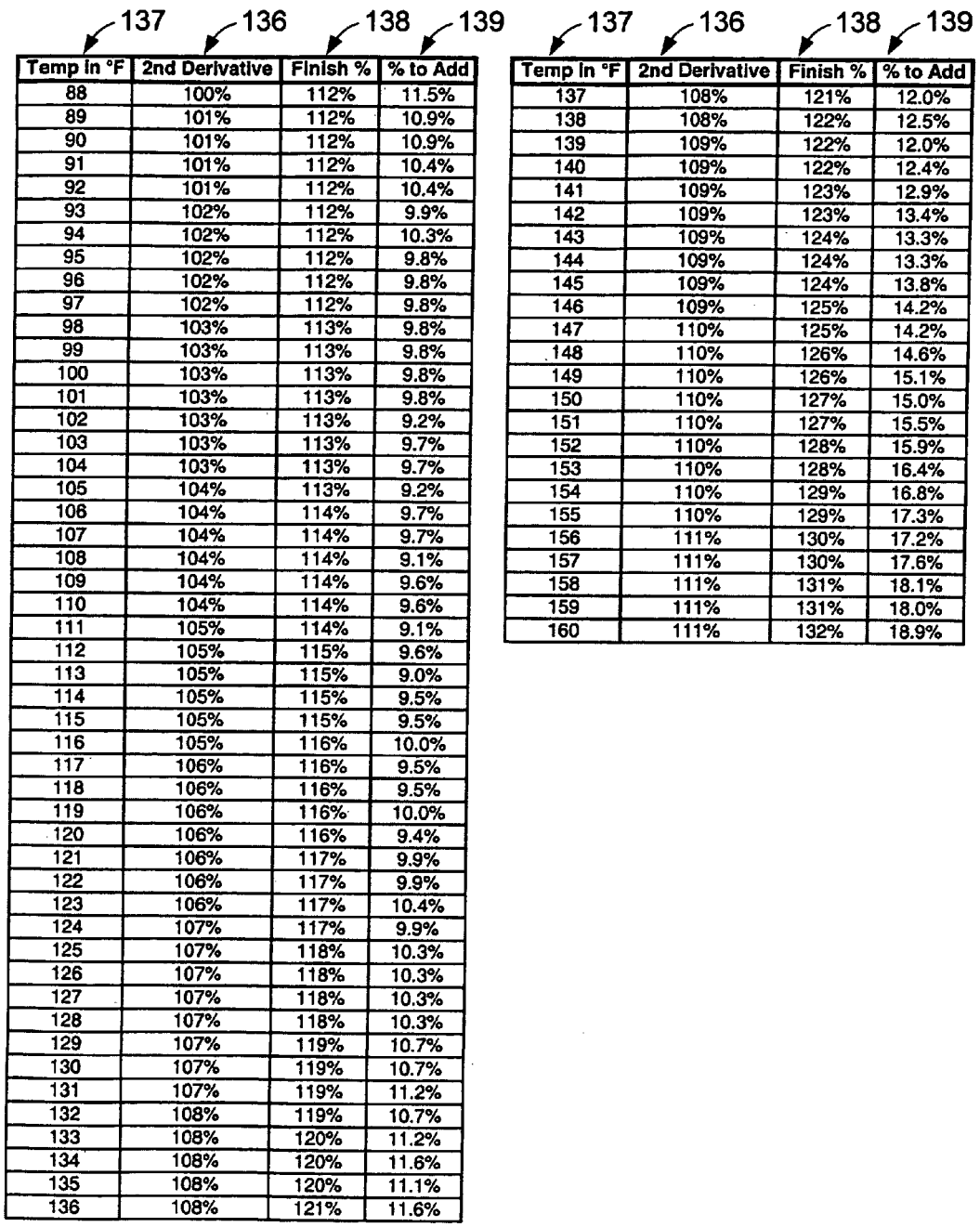

FIG. 3 is composed of FIGS. 3A and 3B and is a presentation in tabular form of the information provided by curves 130 and 135 in FIG. 2, and also further information. In FIG. 3, the data in columns 136 titled "2nd Derivative" are the values of curve 130 at the temperatures indicated in the columns 137 titled "Temp in ° F." That is, the data in columns 136 are the values of p, expressed as percentages of the initial charge deficiency, for the corresponding values of battery temperature $t_B$. The data in the columns 138 titled "Finish %" are the values of the quantity (1+x), expressed as percentages of the battery's initial charge deficiency, for the corresponding values of battery temperature $t_B$. The values in the columns 139 titled "% to Add" are the amounts of charging energy, expressed as percentages of the initial charge deficiency, to be applied to the battery in the interval between attainment of the signal point $(d^2v/dt^2=0)$ and the end of a charging event for the corresponding values of battery temperature $t_B$. In the preferred practice of the invention, at least the information set forth in columns 136-138 in the table of FIG. 3 is contained in a memory which is a part of a microprocessor which is included in a measuring, computing and control device ("MCCD") which is a component of a battery charger according to this invention. That information can be present in memory in different ways. It can be in memory in the form of a database or in the form of one or more lookup tables in which battery temperature is used as the entry point. If desired, that information can be present in memory as a set of algorithms (mathematical equations or expressions) which relate battery temperature to the other charging process parameters or values of interest, and which can be solved by the MCCD, e.g., for the desired values once battery temperature $t_B$ is known.

Figure 7:
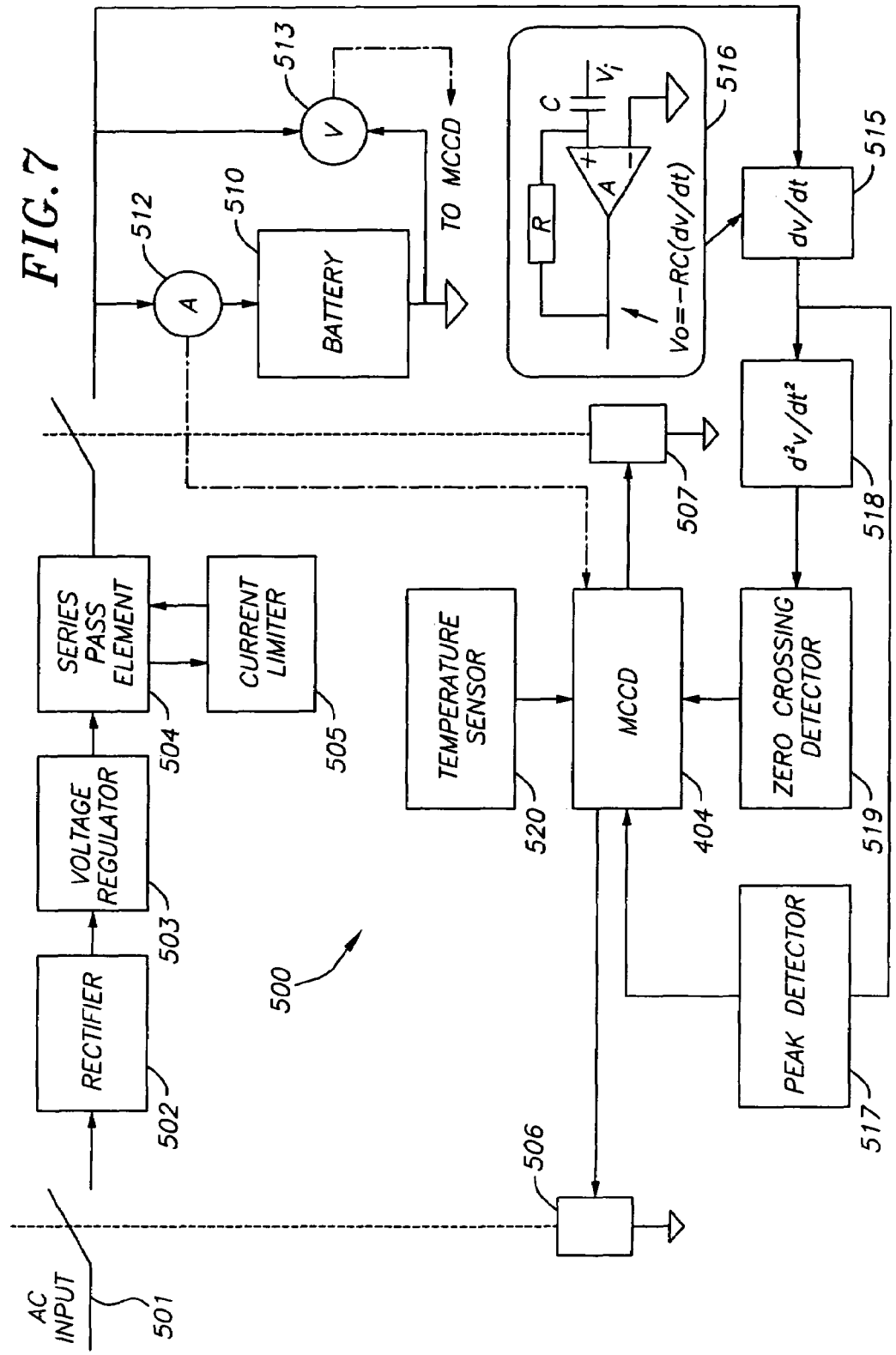
FIG. 7 is a block diagram of an embodiment of a battery charger utilizing an embodiment of the invention's process to charge a battery.

It is within the scope of this invention to measure battery temperature $t_B$ directly, as by a temperature sensor (such as a thermistor) built into a battery and coupled to a battery charger via a conductor and connector associated with the power cables and connectors used to connect a charger to a battery's positive and negative terminals. However, that approach is not presently preferred in the practice of this invention. It is not preferred because adding to the structure of a battery a temperature sensor effective to measure the battery's internal temperature is expensive and adds a level of complexity to a battery charging system. Also, such an approach means that the battery must be specifically built to obtain the benefits of this invention. The preferred way to obtain an effective and useful measure of battery temperature $t_B$ is to assume that the battery charger and the battery to be charged are at substantially the same temperature. That assumption is believed to be usefully and acceptably accurate for the great majority of battery recharge events. Therefore, in the presently preferred practice of this invention, an initial step in the battery recharging process is for the battery charger to take its own temperature; the charger remembers that measured temperature so that it is available later in the process for use in obtaining the pertinent values of p and of (1+x) or x by accessing the lookup table(s) or the value-defining algorithms in the charger's memory (preferably a nonvolatile memory) in which the pertinent data in the table of FIG. 3 is contained. The charger includes a suitable temperature sensor (such as a thermistor and related circuitry) coupled to the MCCD as shown in FIG. 7. In the practice of this invention, a measurement of charger temperature is effectively a measurement of battery temperature.

Figure 4:
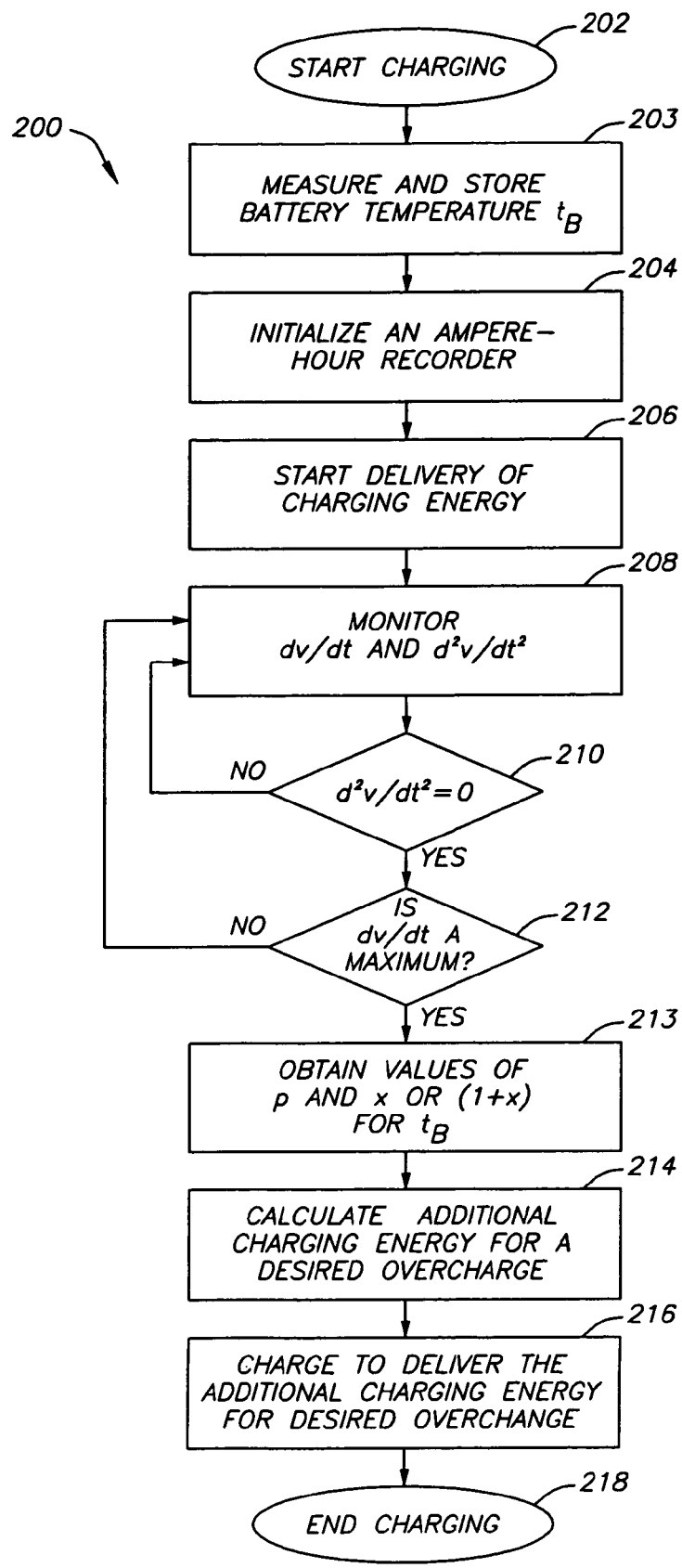
FIG. 4 is a flow diagram of an embodiment of a charging method for a flooded deep cycle lead acid battery.

FIG. 4 is a flow diagram of an exemplary charging process 200 for a flooded deep-cycle lead acid storage battery or a defined small group of such batteries. In order to determine and use first and second derivative information corresponding to the signal point of a battery being charged or recharged, a process to determine the relevant information is executed. Such a process is implemented, for example, as a program set of instructions for a computer, microprocessor or other controlling device that comprises a battery charging system and preferably is part of the battery charger. The instructions may be stored in volatile or non-volatile memory or on a mass storage medium.

At the beginning of process 200, a command 202 is initiated to start the charging process. At step 203, the process measures battery temperature $t_B$ (preferably the charger measures its own temperature and regards that temperature as $t_B$) and stores that temperature measurement. In the next step 204, an ampere-hour recorder is initialized (turned "on"). Delivery of charging energy to the battery is commenced at step 206 so that when the process signal point is reached, the amount of charging energy which has been delivered to that point will be known. Next, monitoring of the first derivative of the voltage and of the second derivative of the voltage is initiated at step 208. The value of the second derivative is evaluated at step 210. If the second derivative is not equal to zero, the process continues to monitor the second derivative at step 208. If the second derivative is equal to zero, the process continues to the evaluation made in step 212. At step 212, the first derivative of the voltage is evaluated to determine if it has reached a maximum value. If it has not, it is continued to be monitored at step 208. If dv/dt is determined to be a maximum value at step 212, process flow branches to step 213. At step 213, the stored value of $t_B$ is called up from storage and is used to obtain the pertinent values of p, and of either x or (1+x) from the information stored in memory. At step 214, the ampere-hour recorder is accessed to obtain the amount $Q_S$ of charging energy delivered to the signal point, and that information, together with the values of p and x (or 1+x) are used to compute the quantity of additional charging energy to be delivered to the battery. That computation includes calculating the value of $Q_D$ using Equation 1 (see above) and then evaluating the relation $(Q_D - Q_S) = Q_A$ in which $Q_A$ is the further second and additional amount of charging energy to be applied to the battery after amount $Q_S$ has been applied.

In an embodiment of the invention, the evaluations performed at steps 210 and 212 may be interchanged without affecting the outcome of the process. Additionally, determination of the maximum of the first derivative of the voltage performed in exemplary step 212 may be done continuously or by utilizing sampling methods known to those skilled in the art.

After the initial charging to the signal point, from initiation of the charging cycle until $d^2v/dt^2 = 0$, has been completed and the additional amount of energy to be applied to provide a desired overcharge has been calculated at step 214, the process (step 216) directs the battery to be charged by an additional amount $Q_A$ to provide the desired overcharge. After the additional charging energy has been delivered to the battery, the charging cycle is stopped at step 218.

As an example of the use of process 200, assume that a battery to be charged has a temperature of 60° F. (15.6° C.), a full charge capacity of 1000 ampere-hours, and a charge deficiency of 500 ampere-hours when the battery is to be recharged. From the data in its memory which corresponds to the data in FIG. 3, upon detection of the signal point in the course of charging that battery, the charger determines that p=0.91 (the signal point was reached when charging energy equal to 91% of the battery's initial charge deficiency had been delivered to the battery), and that (1+x)=1.10, i.e., x=0.10. Using that information, and knowing from the ampere-hour meter that $Q_S$=455 ampere-hours, the charger MCCD determines that $Q_D$=550 ampere-hours. Knowing that $Q_S$=455 ampere-hours, the MCCD evaluates the expressions $Q_D - Q_S = Q_A$ to determine that the magnitude of $Q_A$ is 95 ampere-hours. The charger then delivers that further amount of charging energy to the battery, and then ends the process, i.e., turns itself "OFF".

On the other hand, if that battery were to be 60% discharged and at 85° F. (29.4° C.) at the beginning of a recharge event, then $Q_R$=600 ampere-hours, p=1.00, (1+x)=1.11, and so $Q_S$ will be 600 ampere-hours, $Q_D$ will be 660 ampere-hours, and $Q_A$ will be 60 ampere-hours. But if that battery were to be 35% discharged and to be recharged at 70° F. (21.1° C.), then the following would be applicable:

$Q_R$=350 ampere-hours
p=0.95
1+x=1.10
$Q_S$=332.5 ampere-hours
$Q_D$=385 ampere-hours, and
$Q_A$=52.5 ampere-hours.

It will be recalled that if a battery is very deeply discharged when its recharging event begins, the specific gravity of the acid electrolyte is low (near 1.00) due to the highly diluted state of the electrolyte. The more dilute the electrolyte when recharging begins, the greater will be the density stratification of the electrolyte at full charge, and so the more the electrolyte needs to be stirred by gas generation to properly condition the battery by making the electrolyte substantially homogenous throughout the battery cells. Conversely, if a battery is relatively lightly discharged when its recharging event begins, the acid electrolyte will have a higher starting specific gravity, a lesser density stratification at full charge, and lower need for electrolyte stirring to properly condition the battery. The foregoing examples show that this invention delivers to a recharged battery only that amount of overcharge which is determined to be needed for proper conditioning and does not excessively overcharge the battery. The amount by which the battery is overcharged is a function of the discharge state of the battery and the battery temperature when recharging begins. The point at which the recharging process is ended is determined from information obtained from the charger or from the battery itself.

Figure 5:
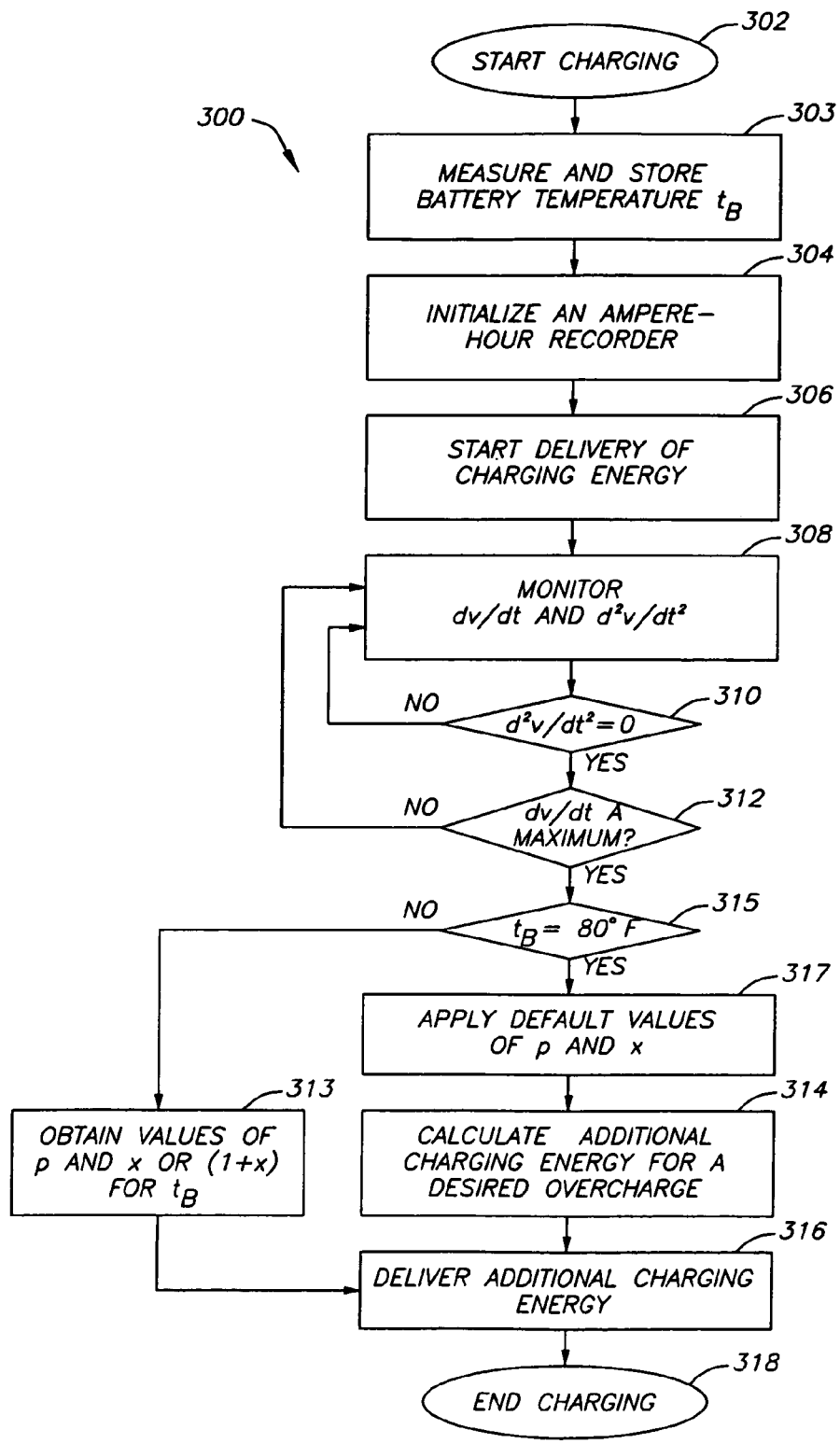
FIG. 5 is a flow diagram of another embodiment of a charging method for a flooded deep cycle lead acid battery.

FIG. 5 is a flow diagram of another battery charging process 300 according to this invention. Steps 302-312 of process 300 can be the same as steps 202-212 of process 200 diagrammed in FIG. 4. Process 300 differs from process 200 in that process 300 enables a user to program the charger, in which process 300 is defined and controlled by software residing in the charger's MCCD and related controller structure, so that the charging process has default settings of $t_B$ and of related process parameters p and 1+x (or x). Accordingly, process 300 can include steps 315 and 317 which are not present in process 200. Once attainment and detection of the signal point has been achieved by process steps 310 and 312, process 300 moves to step 315 in which a determination is made about whether the initial battery temperature $t_B$ measured at step 303 is equal to the default temperature; in the example depicted in FIG. 5, the default temperature is 80° F. (26.7° C.), but the default temperature can be any other specified temperature selected by the user as desirable. If the measured battery temperature $t_B$ equals the selected default temperature, the process proceeds to step 317 in which the default values of p and 1+x (or x) for the default temperature are applied for use in process step 314; in the example depicted in FIG. 5, the default value of p is 0.98 and the default value of 1+x is 1.11. On the other hand, if the measured battery temperature $t_B$ is other than the default temperature, the process operation path branches to step 313 which can be the same as step 213 of process 200, whereby the values of p and 1+x for $t_B$ are obtained from the information present in the memory of the charger controller. Steps 313 and 317 proceed to steps 314-318 (which steps can be the same as steps 214-218 of process 200) to complete the battery charging event.

Process 300 can be used advantageously if the battery or battery set of interest is present in a vehicle, e.g., which is normally used in an essentially constant temperature environment, such as a forklift truck used within a climate controlled warehouse. To enable a charger user to establish a specified default temperature, a charger according to this invention can be equipped with a mechanism by which the desired default temperature and related value of p and of 1+x can be input into the charger controller. If $t_B$ is other than the default temperature, the controller can access the memory for the pertinent values of p and 1+x and can load those values into a computer register (step 317) in the charger controller.

In view of the content of the published patent applications identified above at Cross-Reference to Related Applications, persons skilled in the art will understand that each of processes 200 and 300 can be modified or expanded to provide the process features and operations depicted in FIGS. 3A and 3B, 4A and 4B, 5, 6 and 7 of those published applications and described in the text related to them.

Figure 6:
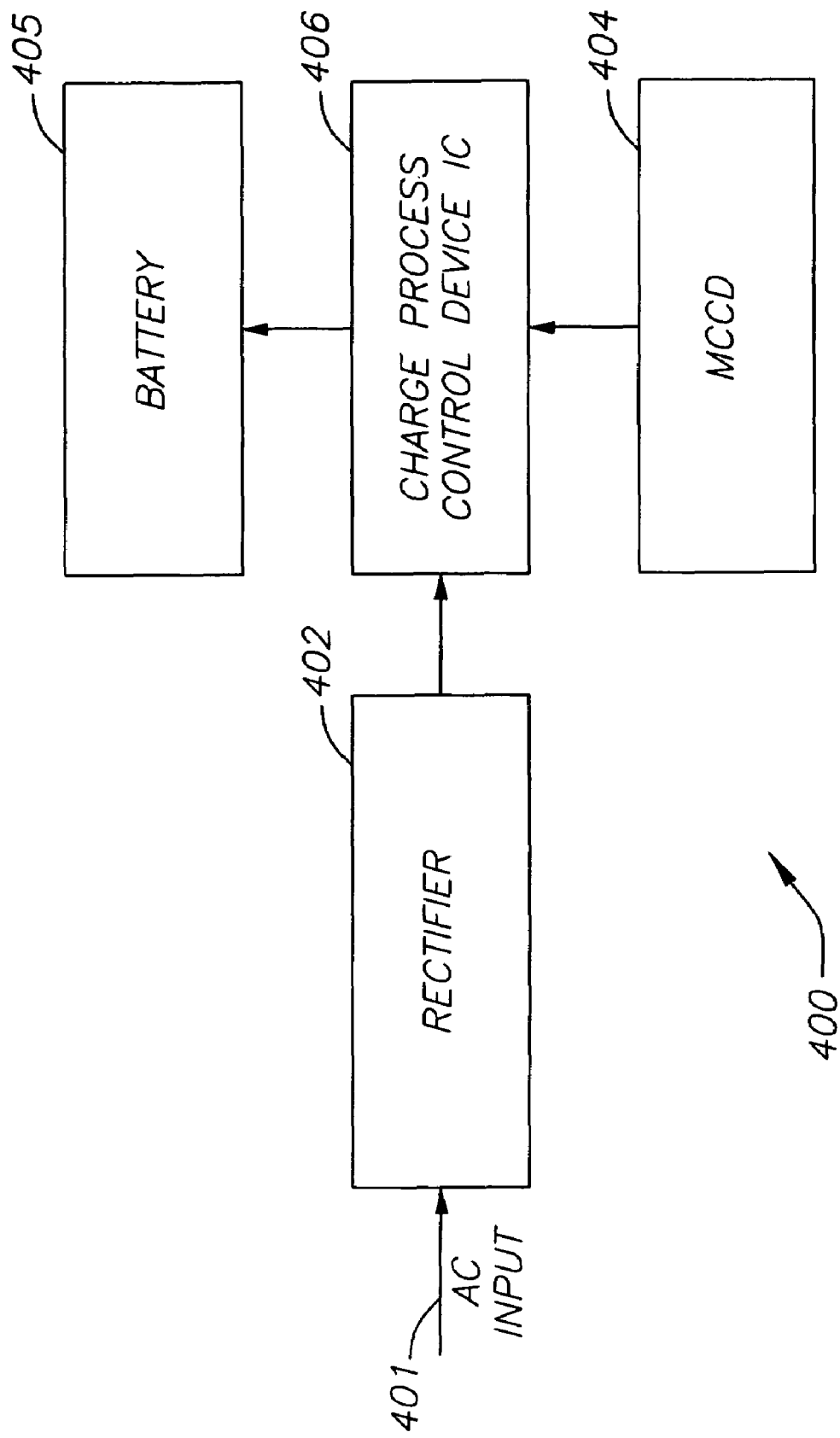
FIG. 6 is a system block diagram of an embodiment of a battery charging system utilizing a charge process control device IC and a measuring computing and control device ("MCCD")

FIG. 6 is a block diagram of an exemplary battery charging system 400 utilizing a charge control algorithm device IC 406 and a "measuring computing and control device" (MCCD) 404 such as a suitably programmed microprocessor including a memory component for storage of the desired data in the table of FIG. 3. An AC input 401 to rectifier 402 creates a DC charging current, at a desired voltage, that is applied to battery 405 through a charge process control device integrated circuit 406. The charge process control device integrated circuit 406 controls application of the charging energy to the battery 405.

The charge control device IC 406 functions in conjunction with the MCCD 404 to apply charging energy comprising one or more charging profiles or processes. Instructions to implement the desired process (processes 200 or 300, e.g.) can be stored in the MCCD 404. Typically storage is achieved by loading a set of program instructions describing the process into the MCCD. Alternatively, the process may be integrated into a custom charge process control integrated circuit which may include the features and functions of integrated circuit 406.

FIG. 7 is a block diagram of a battery charging system 500 capable of implementing one or more of the invention's charging processes to charge a battery or a defined small group of batteries. An AC input 501 is controlled by relay 506. The AC power is applied to rectifier 502 to produce a DC voltage having a ripple component. Voltage regulator 503 reduces the variations in the DC voltage. The regulated DC voltage is applied to a conventionally constructed series pass element 504 that works in conjunction with a conventionally constructed current limiting device 505 to supply a desired current and voltage through the contacts of a relay 507 to battery 510. Current applied to the battery can be monitored by a conventional ampere meter 512. In an alternative arrangement, a conventional averaging ampere meter can be used to indicate an average charge passing through the conductor. In a more preferred arrangement a conventional totalizing ampere meter (ampere-hour meter or recorder) can be used to provide an indication of the total charge passing to the battery. Voltage across the battery terminals can be monitored by volt meter 513. Information obtained from the meters can be supplied to MCCD 404.

The voltage across the battery 510 is also supplied to a differentiator circuit 515 that computes the first derivative of the voltage. Such a circuit may be conventionally constructed as shown at 516. A differentiator typically comprises an operational amplifier A, a resistor R and a capacitor C, connected as known by those skilled into the art to produce a differentiator. A voltage $V_i$ is applied to the input of the differentiator. The signal output $V_O$ is equal to $-RC(dV/dt)$.

The output of the first derivative circuit 515 is fed into a peak detector 517. When a maximum first derivative signal is detected, an indication is provided to MCCD 404. The output of the first derivative processing circuit is also fed to a second derivative processing circuit 518. This circuit is simply a replica of the circuit in 515. The output of the second derivative circuit 518 is fed to a zero crossing detector 519. A zero crossing detector is a circuit that detects a transition in signal polarity, such as when a voltage goes from positive to negative and by necessity crosses through a value of zero volts. Detection of a zero crossing corresponding to the detection of inflection point 115 in voltage curve 101 of FIG. 1 is sought. An indication of the detection of a zero crossing is provided to the MCCD 404. Under control of the process comprising an embodiment of the invention, the MCCD directs a charging current and voltage to be applied through relay 507. The MCCD also can control the operation of the AC input through relay 506. A temperature sensor 520 has its output coupled to MCCD 404. The temperature sensor output is a measurement of the battery temperature $t_B$. As noted above, it is preferred to use the charger temperature as a close approximation of the battery temperature so that the invention can be used with batteries of conventional construction which do not incorporate temperature sensors and related electrical terminals.

It is preferred that the components of the charging system depicted in FIG. 7 be housed in a common charger housing. The charger can be, and preferably is, separate from the battery or thing (e.g., golf car) in which the battery is located.

Charger 500 can be structured or programmed to interrupt charging when $d^2v/dt^2=o$ until the computation of $Q_A$ is completed. More preferably, because there is always a gap between the curves in FIG. 2 ($Q_D$ is greater than $Q_S$) and because of the residual ripple component in the voltage applied by the charger to battery 510, the charger is operated without interruption once $d^2v/dt^2=o$ is first detected so that the occurrence of $d^2v/dt^2=o$ can be confirmed. The residual ripple component in the voltage applied to the battery can, at times, cause $d^2v/dt^2=o$ to be falsely detected, so confirmation of the occurrence of the signal condition is desirable.

It will be seen that this invention provides equipment and procedures for charging a flooded lead acid battery of the deep-cycle type in ways which charge a battery at any initial temperature effectively yet without overly charging the battery to extents which reduce battery life. The battery is overcharged by an amount which is determined as a selected percentage of the charging energy required to place the battery in a state of full charge following completion of its last preceding duty cycle. A recharging event achieved in the practice of this invention inherently allows for and takes into consideration factors such as the battery, age and internal characteristics which impact charging effectiveness and efficiency.

The MCCD can also include programming which operates at the end of each charging event to record in a portion of the MCCD's memory information pertinent to the just-completed charging event. That information can include the date and time of the event, the value of $t_B$ for the event, the total charging energy delivered to the battery or battery set in the course of the event, the duration of the event, and such other information as may be found to be useful. The MCCD can be configured so that, from time to time, that recharging event historical information can be accessed and read from the memory. Such information can be useful to an operator of one or more battery-powered vehicles or other battery-powered devices in making decision about operation, maintenance, or replacement of the batteries or of the related vehicles or other devices. Also, that history information can be useful to manufacturers of battery-powered vehicles or devices, of battery chargers, or of components for such things.

Information gained from the use of the non-temperature compensated methods and equipment described in U.S. Pat. No. 6,087,805 reveals that regulating overcharging in proportion to a battery's initial charge deficiency can meaningfully extend battery life. It has been found that, in the instance of golf cars equipped with flooded deep-cycle lead acid batteries, on average, the life of a set of batteries in such vehicles can be extended from about 1200 discharge-recharge cycles to about 2000 to 2200 cycles. It is expected that the practice of this invention, which is temperature compensated (it takes into consideration and adjusts for the effects of battery temperature upon variables which are material to life-extending battery recharging factors), can further meaningfully extend battery life while providing other benefits to owners and users of equipment using such batteries. The other benefits can include more efficient use of electrical energy needed to power battery recharge events.

While the invention has been described above with reference to recharging a battery, it will be understood that the invention also applies to the recharging of a defined small group of batteries which may be encountered in an electric golf car or some other electrically powered vehicle or device, or with a set of batteries used in connection with a photovoltaic electrical power system, for example. Therefore, in the following claims, the term "battery" means both a single battery and a defined small group of batteries.

As noted in the foregoing INTRODUCTION TO THE DISCLOSURE and the BACKGROUND OF THE INVENTION, there are electric storage battery types which rely on electrochemistries different from the electrochemistry of lead acid batteries, and inflection analysis (including detection of $d^2v/dt^2$) is applicable to the recharging of batteries relying on those different electrochemistries. Those different electrochemistries may be such that temperature affects the relation between the time or point in a recharge event at which the battery has attained a state of full charge, on the one hand, and the time or point in the event at which occurs the condition, or signal point, which in the focus of inflection analysis. Stated differently, batteries of kinds other than the lead acid kind can be subject to temperature effects in recharging which are similar to the effects depicted by curve 130 in FIG. 2 hereof as to a first aspect of this invention. In that event, the charging processes and charger arrangements which have been described pertinent to that curve 130 and that first aspect of this invention can be applied beneficially to processes and equipment for charging such other kinds of batteries, as by including in such chargers a temperature measurement and storage capability and information about how temperature affects the relation between full charge and the condition which inflection analysis is used to detect in controlling a battery charging event.

The foregoing description of preferred and other embodiments and forms of the invention has been presented by way of example, not as a catalog of all forms which equipment procedures in which the invention can be manifested or used to advantage. Workers skilled in the art to which the invention pertains will understand that variations and modifications of the described equipment and processes can be used beneficially without departing from the scope of the invention.

What is claimed is:

1. A method or charging flooded deep cycle lead acid batteries comprising the steps of:

effectively measuring the temperature of such a battery having an initial charge deficiency, applying to the battery a first amount of charging energy adequate, in combination with the initial charge condition of the battery, to cause the battery to attain a detectable charge state which is less than a full charge condition and which has a temperature-variable determinable relation to a full charge condition, providing information describing the variation with temperature of a) the relation of the first amount of charging energy to the initial charge deficiency of the battery, and b) the relation of total charging energy deliverable to the battery to attain full charge and effective conditioning of the battery to the initial charge deficiency of the battery, and applying to the battery a further second increment of charging energy which is adequate, in combination with the initial charge condition and the first amount of charging energy, to overcharge the battery to a particular extent which can vary with battery temperature and the quantity of which is determined as a selected percentage of the first amount of charging energy when the detectable state is attained and with respect to a battery having the measured temperature.

2. The method according to claim 1 in which determining the quantity of the second increment of charging energy includes evaluating the relation $QD=Qs(1+x)/p$ in which QD is the total charging energy to be delivered to the battery in the period from the commencement of a battery charge event of interest to the end of that event, Qs is the first amount of charging energy, and, for a battery having the measured temperature, x is the decimal equivalent of the particular percentage and p is the decimal value of the ratio of the first amount of charging energy to the initial charge deficiency of the battery.

3. The method according to claim 2 including the further steps of providing information describing the variations in the values of p and of x with battery temperature, and obtaining from that information the values of p and of x for the measured temperature.

4. The method according to claim 3 in which said information is provided substantially in tabular form.

5. The method according to claim 3 in which said information is provided substantially in algorithmic form.

6. The method according to claim 1 in which determination of the quantity of the second amount of charging energy includes obtaining from said information the value of said relations for the measured temperature.

7. The method according to claim 6 in which said information is provided substantially in tabular form.

8. The method according to claim 6 in which said information is provided substantially in algorithmic form.

9. The method according to claim 1 in which the step of effectively measuring the temperature of such a battery comprises measuring the temperature of a battery charger with which the battery is associated.

10. The method according to claim 9 in which the operation of measuring the temperature of a battery charger is conducted in association with the commencement of application of the first amount of charging energy to the battery.

* * * * *

UNITED STATES PATENT AND TRADEMARK OFFICE
CERTIFICATE OF CORRECTION

PATENT NO. : 7,589,491 B2
APPLICATION NO. : 11/372702
DATED : September 15, 2009
INVENTOR(S) : William B. Brecht It is certified that error appears in the above-identified patent and that said Letters Patent is hereby corrected as shown below:

In the Claims

Column 21, line 61        Delete "or"

Insert -- for --.

Signed and Sealed this

Fourth Day of May, 2010

David J. Kappos
*Director of the United States Patent and Trademark Office*